Patented June 27, 1939

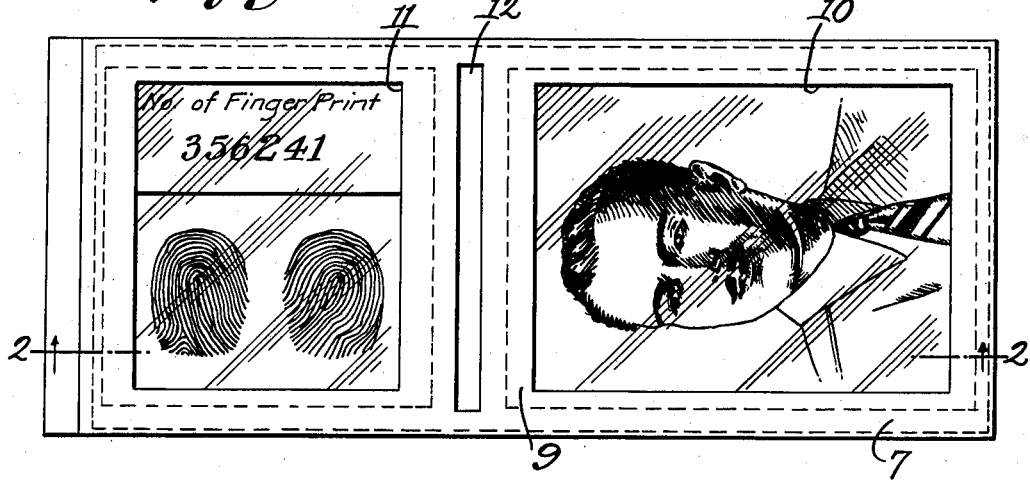
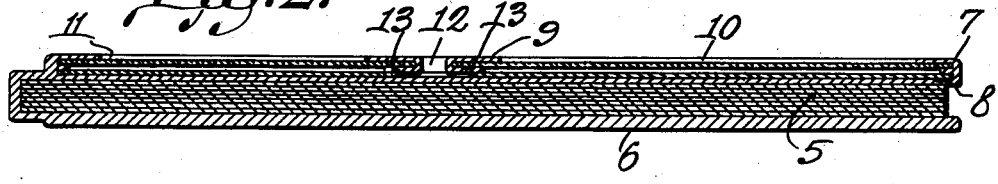
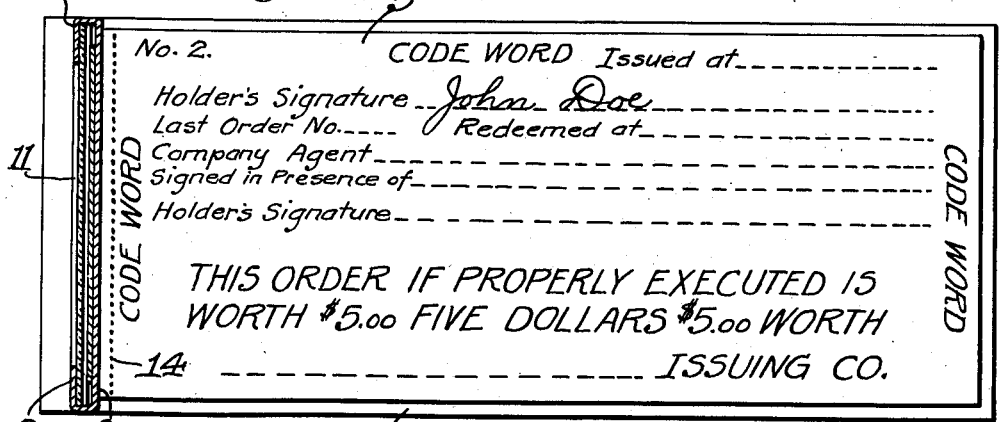

2,163,777

UNITED STATES PATENT OFFICE 2,163,777

TRAVELER'S PROTECTION ORDER

Leopold Deutsch, Girard, Ohio

Application April 15, 1938, Serial No. 202,306

1 Claim. (Cl. 281—31)

Travelers, and particularly tourists, frequently encounter difficulty in establishing their identity while traveling, and as a result, cannot obtain necessary funds to pay their expenses during such travel, thereby necessitating the carrying of large sums of money to defray expenses on the road, with the resultant possibility of loss by robbery or misplacement.

It is therefore the primary object of the present invention to provide a protective order or negotiable commercial instrument of limited value, which may be readily cashed at prearranged stations or commercial houses, for the convenience of the owner of the instrument, as well as to provide a financial gain or profit to the person honoring or cashing the instrument.

An important object of the invention is to provide means whereby the identity of the person passing the commercial instruments may be positively determined, without danger of fraud, to the end that a commercial transaction involving the instruments, may be carried out without fear or danger of loss by the person cashing such instruments.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a plan view of the book in which the commercial instruments are held.

Figure 2 is a sectional view taken on line 2—2 of Figure 1.

Figure 3 is a view illustrating one of the commercial instruments or order.

Referring to the drawing in detail, the negotiable instruments or orders forming the essence of the present invention, are indicated generally by the reference character 5, the face of the instrument being printed to indicate value to be determined by the company issuing the instrument, each book of instruments being numbered and designated by a particular code word known to the company issuing the book of instruments, as well as the person to whom the instruments are issued. It will of course be understood that the various stations or commercial houses designated to cash the instruments, will also be provided with means for checking the code word of any particular book presented by a person wishing to redeem one of the instruments.

Each instrument will also be provided with a space near the top thereof, for the reception of the signature of the person to whom the instruments are issued. Directly under the space for the signature of the holder of the instruments, will be a space to receive indicia designating the number of the last order or instrument cashed, as well as a space designating the town or city at which the instrument was redeemed. The face of each instrument will also be supplied with printed matter and a line to receive the name of the agent issuing the book of instruments or orders. Another space is provided directly under the space in which the name of the company agent appears, for the signature of a person witnessing the transferring of the book of instruments, to the person to whom the instruments are sold.

Near the central portion of each instrument is printed matter and a line on which the signature of the person receiving the book of orders or instruments, so that in redeeming one of the orders, the person receiving merchandise and cash, may sign in the presence of the person with whom he is transacting business, so that the person may compare his signature with the signature appearing at the top of the instrument, to prevent use of the instrument by fraud.

Indicia on each instrument will indicate the value of each instrument, and while the value of the instrument may be varied, to meet various requirements, it is contemplated to value each instrument or order at $5.00.

The book in which the instruments or orders are contained, comprises a back 6 and a cover section 7, the cover section comprising spaced members 8 and 9, the member 9 being formed with a substantially large cut-out portion 10, and a small cut-out portion indicated by the reference character 11, the cut-out portions 10 and 11 being separated by an elongated cut-out portion 12.

The large cut-out portion 10 provides an opening under which a photograph of the person to whom the book of instruments is issued, the photograph being positioned by passing the same through the elongated cut-out portion 12. The substantially small cut-out portion 11, affords a space for a card on which the finger prints of the person to whom the book of instruments is issued, for identification means. It is also contemplated to register the finger prints of the person holding the book of instruments, giving the number of the finger prints, which number is recorded in the main office of the company issuing the book.

The ends of the cover section are closed, so that the photograph and card held therein, will not become detached from the book, while the book is being handled in the ordinary way.

As clearly shown by Figure 2 of the drawing, portions of the member 9, adjacent to the cut-out portions 10 and 11, are extended inwardly as at 13, so that the card or photograph positioned in the cover, may be extended into the space between the inturned portions 13 and upper surface of the member 9, securely holding the ends of the card or photograph to the cover.

The instruments or orders are formed with lines of perforations indicated at 14, whereby the instruments may be readily torn from the book.

In the use of the instruments, it is contemplated to sell a book of instruments or orders to a person for use in travel, the value of the book to be determined by the value of the individual instruments or orders contained therein.

A person holding one of the books, may present the book at a designated station or commercial house, and by use of the material contained in the book, establish his identity to the end that the person may redeem the instrument or order in articles of merchandise, the person presenting the instrument or order receiving the balance to make up the value of the instrument in cash.

In this way it is only necessary for the user of the instrument to cash the instruments as needed, thereby eliminating the necessity of a person carrying large sums of money with the danger of loss by robbery or misplacement.

I claim:

A book of the class described comprising a cover section and a back section, the cover section embodying spaced upper and lower members secured together at their outer edges, the upper member having substantially large spaced cut-out portions, defining a frame for the reception of cards held by the cover, the portion of the cover between the cut-out portions having a transversely disposed elongated opening communicating with the cut-out portions, whereby said cards may be inserted in the cut-out portions through said elongated opening.

LEOPOLD DEUTSCH.